UNITED STATES PATENT OFFICE.

GEORGE J. SNELUS, OF WORKINGTON, COUNTY OF CUMBERLAND, GREAT BRITAIN, ASSIGNOR TO EDWARD COOPER AND ABRAM S. HEWITT, OF NEW YORK, N. Y.

IMPROVEMENT IN LININGS OF CUPOLA, REVERBERATORY, BESSEMER, AND OTHER FURNACES USED IN THE MANUFACTURE OF IRON AND STEEL.

Specification forming part of Letters Patent No. 218,405, dated August 12, 1879; application filed February 6, 1879; patented in England, March 25, 1872.

*To all whom it may concern:*

Be it known that I, GEORGE JAMES SNELUS, of Workington, in the county of Cumberland and Kingdom of Great Britain, have invented a new and useful Improvement in Linings of Cupola, Reverberatory, Bessemer, and other Furnaces used in the Manufacture of Iron and Steel, which improvement is fully set forth in the following specification.

My invention has for its object the improvement of the lining of cupolas, reverberatory furnaces, Bessemer converters, and such like vessels in which iron and steel are treated in a molten condition, with the view of obtaining readily a basic slag in these processes, for the double purpose of preventing the wear of the lining, and also of purifying the metal under treatment from such deleterious bodies as phosphorus and sulphur.

Hitherto fire-clay, silica, ganister, and similar materials have been used as fire-resisting substances for lining furnaces in which metals are melted. Now, all these substances are essentially silica, or contain a large proportion of that body. As all chemists are aware, silica plays the part of an acid in combining with bases at high temperatures; but when metals are melted or "blown," as in the Bessemer process, they become more or less oxidized, and the oxides so formed combine with the silicious lining of the furnace and wear it away by forming a fusible slag. Furthermore, it is never possible in furnaces so lined to obtain a thoroughly basic slag, and I have proved that phosphorus and sulphur can only be removed from iron in the presence of a highly basic slag. In the puddling process phosphorus and sulphur are removed, because the slag is highly basic, oxide of iron forming the bed of the furnace; but this will not stand the high temperatures required in steel-making.

I make the lining of all furnaces in which metals or oxides are melted or operated upon while fluid entirely of some basic body, by preference lime or magnesia, or mixtures of these substances, with or without a small quantity of oxide of iron to cement them and to form a glaze upon the surface. In special cases I make a mixture of finely-ground coke-dust and lime for the refractory lining. There are several methods of applying these materials. First, the well-burned lime or magnesia, or a mixture of these substances, with or without oxide of iron or coke-dust, is rapidly crushed and kept hot enough to prevent it absorbing moisture. It is then rammed in between the core and the iron casing of the vessel to be lined, which may be a cupola, revolving furnace, Bessemer converter, or iron box to form the bed of a reverberatory furnace. If bricks are used in the reverberatory furnace, and in other cases where bricks are used, the above lining should be separated from the brick-work by a mixture of lime and coke-dust, gradually increasing the coke-dust and decreasing the lime as the separating material approaches the brick-work. A little limestone is, as usual, added to the charge in cupola-furnaces to form a neutral slag with the ash of the fuel. This may also be added in reverberatory furnaces.

Another method of putting in this basic lining is to grind the unburned limestone or magnesian limestone, with or without a little oxide of iron, into a stiff paste, with a little water, and then to ram the space to be lined in the cupola, revolving furnace, Bessemer converter, reverberatory furnace, or other apparatus with this material, which is plastic, like clay. It is then carefully dried and fired. After drying it will be hard and compact, and when fired at a high temperature will become glazed on the surface and converted for some depth into lime. In this case it is necessary to make provision for the escape of the carbonic acid liberated as the limestone burns to lime. This can generally be done by drilling a few holes in the outer casing. I then find no difficulty in keeping the lining in form, either in the cupola or in the Bessemer converter, as it does not break away. It also lasts longer than the ordinary materials now used, as it is too refractory to melt itself, and it is not affected, like a silicious lining, by the action of melted oxides. A portion slags away, but nothing like so much as when bricks or ganister are used. There are, besides, other advantages accruing from the use of a basic lining in the place of a silicious one.

Another method of forming this basic lining is to compress the ground materials into bricks, and use these either burned or unburned; or the material may be used in the form of quarried blocks, which should be sound, and without veins of foreign material running through them. Whatever method is used, it is, of course, desirable that the material should contain as little silica as possible.

Of the methods above described, I prefer that in which the material when put in is like ground limestone; but other methods of putting in the material will suggest themselves, and I do not limit myself to the above methods of using it.

I do not claim the use of limestone in puddling-furnaces, as I am aware it has frequently been used for this purpose, but always in a furnace having an ordinary brick or silicious roof.

What I claim is—

The improved lining for cupolas, reverberatory furnaces, Bessemer converters, rotating furnaces, &c., composed of lime or limestone, either wholly calcic or magnesian, the materials being burned before or after their introduction into the furnace at the highest possible temperature, substantially as above described, the same having been described by me in my Patent No. 908 of A. D. 1872 in the series of British patents.

GEORGE JAMES SNELUS.

Witnesses:
J. HEWITSON BROWN,
H. HODGSON.